(12) United States Patent
Hong et al.

(10) Patent No.: US 7,130,149 B2
(45) Date of Patent: Oct. 31, 2006

(54) FLUID-BORNE CONTAMINANT PROTECTION USING A FILTER ASSEMBLY WITH A LEADING EDGE GUIDE SURFACE

(75) Inventors: Yiren Hong, Singapore (SG); ChoonKiat Lim, Singapore (SG); Pohlye Lim, Singapore (SG); James H. Smith, Woodside, CA (US); Walter Wong, Boulder, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 367 days.

(21) Appl. No.: 10/274,862

(22) Filed: Oct. 21, 2002

(65) Prior Publication Data

US 2003/0218828 A1 Nov. 27, 2003

Related U.S. Application Data

(60) Provisional application No. 60/383,093, filed on May 23, 2002.

(51) Int. Cl.
*G11B 33/14* (2006.01)

(52) U.S. Cl. ............................................. 360/97.02
(58) Field of Classification Search .......... 360/97.02, 360/97.03, 97.04, 133; 720/648, 649
See application file for complete search history.

(56) References Cited

U.S. PATENT DOCUMENTS

| | | | | |
|---|---|---|---|---|
| 4,369,475 A | * | 1/1983 | Ho et al. ................. | 360/97.02 |
| 4,594,626 A | * | 6/1986 | Frangesh ................. | 360/97.02 |
| 4,710,830 A | * | 12/1987 | Imai et al. ............... | 360/97.03 |
| 4,789,913 A | * | 12/1988 | Gregory et al. .......... | 360/97.03 |
| 4,831,475 A | * | 5/1989 | Kakuda et al. .......... | 360/97.03 |
| 4,885,652 A | * | 12/1989 | Leonard et al. ............. | 360/133 |
| 5,025,336 A | * | 6/1991 | Morehouse et al. ...... | 360/97.02 |
| 5,229,899 A | * | 7/1993 | Brown et al. ............ | 360/97.02 |
| 5,307,222 A | * | 4/1994 | Dion ....................... | 360/97.02 |
| 5,537,270 A | * | 7/1996 | Morehouse et al. ...... | 360/97.02 |
| 6,168,651 B1 | | 1/2001 | Tuma et al. | |
| 6,238,467 B1 | | 5/2001 | Azarian et al. | |
| 6,266,208 B1 | | 7/2001 | Voights | |
| 6,296,691 B1 | | 10/2001 | Gidumal | |
| 6,395,073 B1 | | 5/2002 | Dauber | |
| 6,542,328 B1 | * | 4/2003 | Harrison et al. .......... | 360/97.03 |

* cited by examiner

*Primary Examiner*—Tianjie Chen
(74) *Attorney, Agent, or Firm*—Fellers, Snider, et al.

(57) ABSTRACT

Method and apparatus for protecting a data storage device from fluid-borne contaminants. The device includes a housing in which a rotatable disc is supported, the disc having a data recording surface and an outermost perimeter. A filter assembly includes a first filter adjacent to the data recording surface and a second filter disposed beyond the outermost perimeter of the disc. During disc rotation, fluidic currents are generated and impinge a leading edge guide surface of the first filter. A first portion of the currents passes into a gap between the first filter and the data recording surface. A second portion of the currents passes along the leading edge guide surface to the second filter. The first filter is preferably characterized as a chemical adsorbent filter which adsorbs vapor phase (gaseous) contaminants, and the second filter is preferably characterized as a pass-through recirculation filter which captures particulate contaminants.

19 Claims, 5 Drawing Sheets

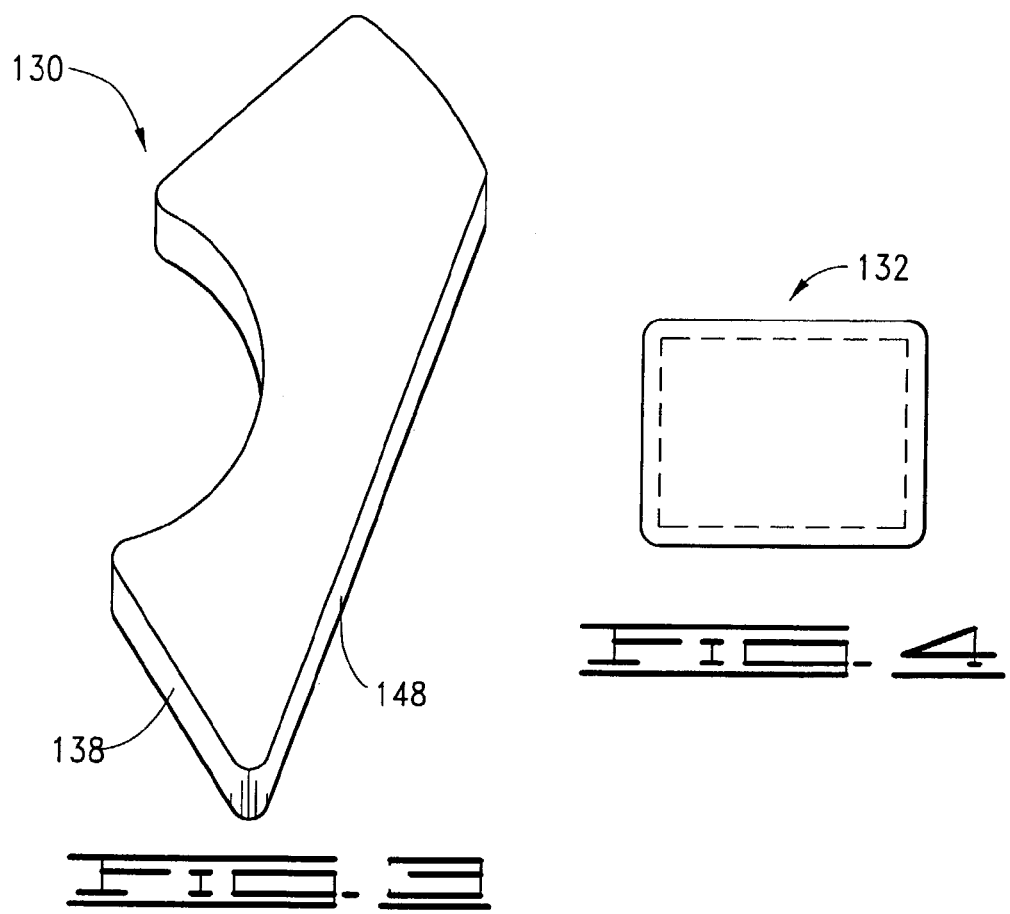
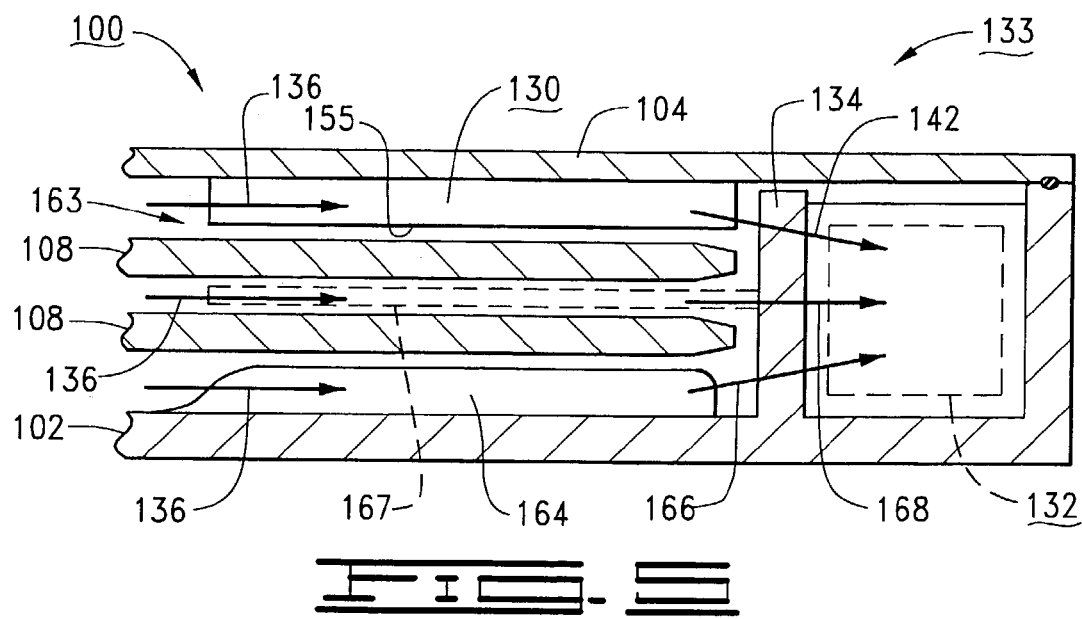

FLUID-BORNE CONTAMINANT PROTECTION USING A FILTER ASSEMBLY WITH A LEADING EDGE GUIDE SURFACE

RELATED APPLICATIONS

This application claims domestic priority under 35 U.S.C. §119(e) to U.S. Provisional Application No. 60/383,093 filed May 23, 2002.

FIELD OF THE INVENTION

The claimed invention relates generally to data storage devices and more particularly to the directing and filtering of recirculating fluidic currents established within a data storage device.

BACKGROUND

Disc drives are digital data storage devices which store and retrieve large amounts of user data in a fast and efficient manner. The data are magnetically recorded on the surfaces of one or more data storage discs affixed to a spindle motor for rotation at a constant high speed.

An array of vertically aligned data transducing heads are controllably positioned by an actuator to read data from and write data to tracks defined on the recording surfaces. An actuator motor rotates the actuator to move the heads across the disc surfaces. The heads are configured to be aerodynamically supported over these surfaces by fluidic (for example, air) currents established by the high speed rotation of the discs.

It is desirable to minimize the presence of fluid-borne particulate and vapor phase (gaseous) contamination within a data storage device housing, as such contamination can adversely affect data storage and transfer performance. Data storage housings are typically sealed using gaskets and similar features to prevent the ingress of contaminants from the external environment.

It has been found that a large pressure differential between the interior and exterior of a housing (such as by elevated temperatures or changes in altitude) can potentially lead to failure of the housing seal. Thus, instead of providing a completely sealed housing, designers typically provide a small diffusion path between the interior of the housing to the external environment to allow equalization of interior and exterior atmospheric pressures.

A typical diffusion path (diffusion tube) is formed through a housing wall and provides an elongated, narrow channel which permits fluidic flow while at the same time restricting passage of contaminants along the length of the channel.

Filters are further typically placed within the housing to remove contaminants from the internal recirculating fluidic currents established by rotation of the discs. Such filters typically include pass-through recirculation filters and chemical adsorbent filters.

A pass-through recirculation filter generally captures fluid-borne particulates as fluidic currents are directed through the filter. A typical construction includes pieces of filter media (such as polytetrafluoroethylene, PTFE) laminated to a nonwoven backing material or a fabric encapsulated, pillow-shaped filter containing electrostatic or other filter media.

A chemical adsorbent filter generally adsorbs gaseous and small diameter particulate contaminants as fluidic currents pass across a surface of the filter. A wide variety of constructions have been proposed including the use of activated carbon and silica based desiccant granules as an adsorbent media. The adsorbent media is typically melded into a contiguous block (brick) or is encapsulated within a semi-rigid permeable boundary layer of material.

Disc drive designers are constrained by a number of factors, including continually reduced form factors and internal clearance issues, to provide effective filtering and flow control. With the continued demand for higher performance data storage devices, there remains a continual need for improved approaches to directing and filtering recirculating fluidic currents within such devices. It is to such improvements that the claimed invention is directed.

SUMMARY OF THE INVENTION

In accordance with preferred embodiments, a data storage device comprises a housing which supports a rotatable disc having a data recording surface and an outermost perimeter.

A filter assembly is positioned within the housing and comprises a first filter adjacent to the data recording surface of the disc, and a second filter disposed beyond the outermost perimeter of the disc.

The first filter is preferably characterized as a chemical adsorbent filter having a leading edge guide surface which extends substantially across a radial extent of the disc to the outermost perimeter, and a vapor phase adsorbent carpet surface which extends in a facing relationship with the data recording surface. The second filter is preferably characterized as a pass-through recirculation filter configured to capture fluid-borne particulate contaminants.

During operation, the disc is rotated to generate fluidic currents within the housing. The fluidic currents impinge the leading edge guide surface of the first filter so that the currents are divided into first and second portions. The first portion passes into a gap between the first filter and the data recording surface. The second portion passes along the leading edge guide surface to the second filter.

These and various other features and advantages which characterize the claimed invention will become apparent upon reading the following detailed description and upon reviewing the associated drawings.

BRIEF DESCRIPTION OF THE DRAWINGS

FIG. 3 provides an isometric view of the chemical adsorbent filter.

FIG. 4 provides an elevational view of the recirculation filter.

FIG. 5 provides an elevational, cross-sectional view of the data storage device.

DETAILED DESCRIPTION

Figure 1:
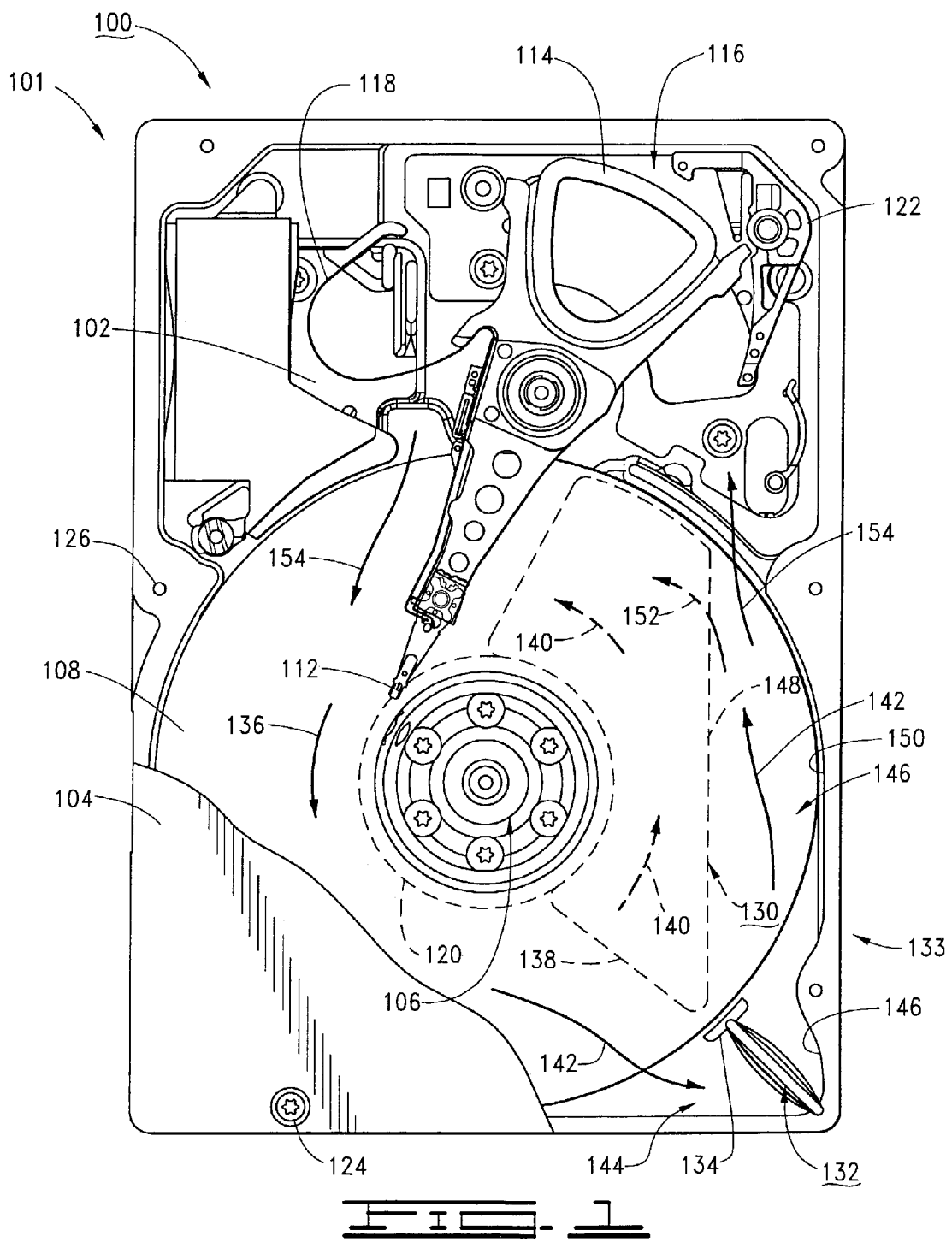
FIG. 1 is a top plan view of a data storage device constructed in accordance with preferred embodiments of the present invention to store data to a rotatable disc, the data storage device utilizing a filter assembly comprising a chemical adsorbent filter adjacent a data storage surface of the disc and a pass-through recirculation filter adjacent a perimeter of the disc.

FIG. 1 provides a top plan view of a data storage device constructed in accordance with preferred embodiments of the present invention. The data storage device is preferably characterized as a disc drive 100 which magnetically stores digital data from a host device (not shown).

The disc drive 100 includes a rigid housing 101 which defines and internal environment for the drive. The housing is formed by mating of a pair of housing members comprising a base deck 102 and a top cover 104 (shown in partial cutaway).

A spindle motor 106 supported within the housing 101 rotates a number of magnetic recording discs 108 at a constant, high speed. A rotary actuator 110 controllably moves a corresponding number of data transducing heads 112 across recording surfaces of the discs 108 through application of current to a coil 114 of a voice coil motor (VCM) 116.

The heads 112 are aerodynamically supported over the recording surfaces by fluidic currents established by rotation of the discs 108. For purposes of the present discussion, it will be contemplated that the disc drive 100 includes two discs 108 and four heads 112, although other numbers of discs and heads can be used as desired.

A flex circuit assembly 118 provides electrical communication paths between the actuator 110 and a disc drive printed circuit board (PCB) mounted to the underside of the base deck 102. When the disc drive 100 is deactivated, the heads 112 are brought to rest onto texturized landing zones 120 near the innermost diameters of the discs 108 and a latch 122 secures the actuator 110 in a parked position. Fasteners (one shown at 124) extend through the top cover 104 and into receiving apertures (one denoted at 126) in the base deck 102 to secure the top cover 104 in place.

Figure 2:
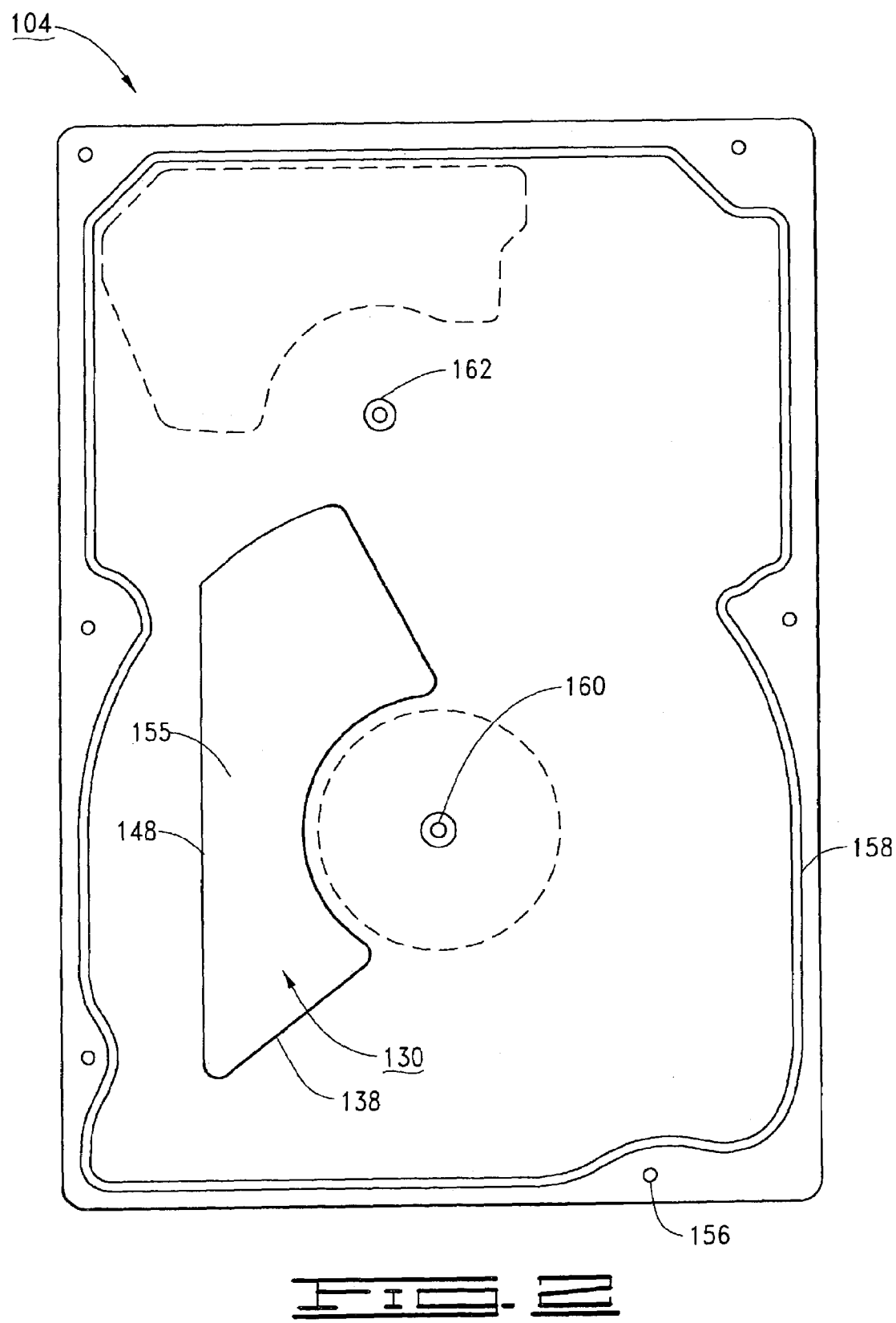
FIG. 2 shows the underside of the top cover to illustrate a preferred configuration and attachment location of the chemical adsorbent filter, which includes a leading edge that directs a portion of the fluidic currents established by rotation of the discs to the recirculation filter.

Of particular interest in FIG. 1 is a chemical adsorbent filter identified diagrammatically at 130. The adsorbent filter 130 ("first filter") is preferably attached to the underside of the top cover 104 as shown in FIG. 2. The adsorbent filter 130 operates to adsorb vapor phase (gaseous) contaminants from the recirculating fluidic currents established within the housing 101. The adsorbent filter 130 further operates as a fluidic guide to controllably direct portions of the fluidic currents to a pass-through recirculation filter 132 ("second filter"). For reference, the adsorbent filter 130 and the recirculation filter 132 are collectively referred to herein as a filter assembly 133.

The recirculation filter 132 is supported by a support member 134 at a location beyond the outermost perimeter of the discs 108 and captures particulate contaminants in the fluidic currents as the currents pass through the filter. Additional views of the respective filters 130, 132 are provided in FIGS. 3 and 4.

To better explain the operation of the filter assembly 133, as shown in FIG. 1 the high speed rotation of the discs 108 generates a combined set of fluidic currents generally denoted by arrow 136. As the currents 136 encounter a leading edge guide surface 138 of the adsorbent filter 130, some of the currents pass into a gap between the top disc 108 and continue on around to the top head 112. These currents are denoted by broken arrow 140 and are collectively referred to as a first portion of the currents.

The leading edge guide surface 138 ("first guide surface") substantially extends across the radial extent of the top disc 108 to the outermost perimeter of the disc. Other currents, denoted by arrow 142 and collectively referred to as a second portion, are directed along the length of the surface 138 and enter a channel 144 between the support member 134 and a side wall 146 of the housing 101 in which the recirculation filter 132 is disposed.

The currents 142 flow through the recirculation filter 132 and pass back adjacent the discs 108 as shown. The currents 142 at this point are guided along a channel 146 bounded by a second guide surface 148 of the adsorbent filter 130 and a shrouding surface 150 of the housing 101. Some of the currents 142 pass under the second guide surface 148 and into the gap between the filter 130 and the top disc 108 (denoted by arrow 152), while other currents 142 (arrows 154) flow along the second guide surface 148 to the VCM 116 to convectively cool the actuator coil 114.

As mentioned above, FIG. 2 generally illustrates the underside of the top cover 104 to show a preferred placement of the adsorbent filter 130. It will be understood, however, that the filter 130 can alternatively be placed on the base deck 102 under the bottom disc 108. The filter 130 is preferably affixed in place using a layer of pressure sensitive adhesive. The filter 130 is shown in FIG. 2 to include an adsorbent (carpet) surface 155 which runs parallel to the top disc 108 when the top cover 104 is installed.

With reference again to FIG. 1, while some particulate and gaseous contaminant adsorption will tend to take place through the impingement of the fluidic currents 136, 142 onto the first and second guide surfaces 138, 148 (i.e., the edges of the filter 130), it is contemplated that most of the contaminant adsorption will take place as the currents 140, 152 pass across the carpet surface 155 in the gap between the disc 108 and the filter 130. The filter 130 is preferably configured to reduce turbulence (induce laminar flow) in the currents exiting the filter 130 and passing in the vicinity of the head 112.

Continuing with FIG. 2, a series of fastener apertures (one denoted at 156) in the top cover 104 align with the base deck apertures 126 of FIG. 1 to accommodate the fasteners 124. A compressible gasket 158 extends near the perimeter of the top cover 104 to effect a seal at the junction between the base deck 102 and top cover 104. Apertures 160 and 162 accommodate fasteners (not shown) to secure shafts of the spindle motor 106 and actuator 110, respectively, to the top cover 104.

FIG. 5 provides an elevational, cross-sectional view of relevant portions of the disc drive 100 to further illustrate the cooperative operation of the respective filters 130, 132. The aforementioned gap between the top disc 108 and the carpet surface 155 of the filter 130 is numerically denoted at 163, and can be selected to be any suitable width. A base deck guide surface 164 projects upwardly from the base deck 102 to divert a portion of the combined currents 136 underneath the bottom disc 108 to the recirculation filter 132. Such diverted currents are denoted by arrow 166.

An optional cantilevered diverting arm (shown in broken line at 167) can be added between the discs 108 to further direct intermediary air currents (arrow 168) to the recirculation filter 132 and to induce laminar flow in the air currents that reach the heads 112.

Figure 6:
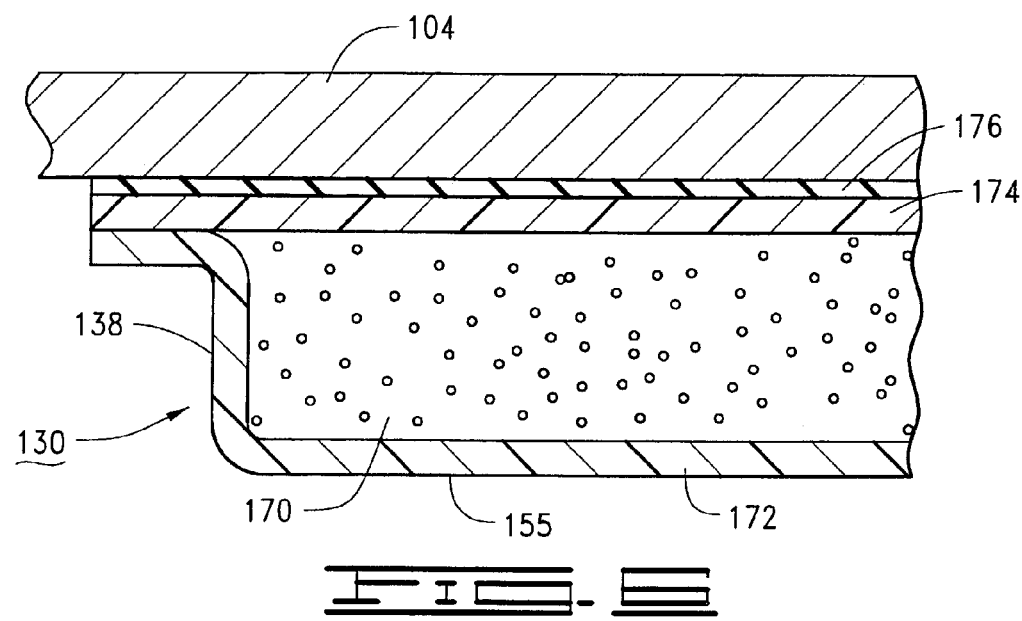
FIG. 6 provides an elevational, cross-sectional view of the chemical adsorbent filter in accordance with a first preferred construction.

FIG. 6 provides a cross-sectional view of the adsorbent filter 130 in conjunction with the top cover 104 to show a first preferred construction. The filter 130 preferably comprises adsorbent media 170 encapsulated in permeable protective layers 172, 174. The filter 130 is shown to be affixed to the top cover 104 using a thin layer of adhesive 176.

The media preferably comprises an admixed volume of activated carbon and desiccant silica particles, although other chemically adsorbent materials can be readily used as desired depending upon the requirements of a given application.

It has been found that the filter 130 can accommodate over 150 milligrams (mg) of activated carbon in the media volume in a disc drive having a 2.5 inch form factor, which promotes higher contaminant and relative humidity control as compared to prior art configurations.

The protective layers 172, 174 are preferably formed from an extruded or expanded porous material such as polypropylene or porous polytetrafluoroethylene (PTFE). The layers can be bonded together to encapsulate the adsorbent media in any number of ways depending upon the requirements of a given application.

Although not shown in FIG. 6, additional intermediary filtering layers can be readily included in the filter 130 between the media 170 and the layers 172, 174, including layers of paper, electrostatic material, PTFE mixed with polyamide fibers, etc. to enhance the particulate filtering characteristics of the filter 130.

Figure 7:
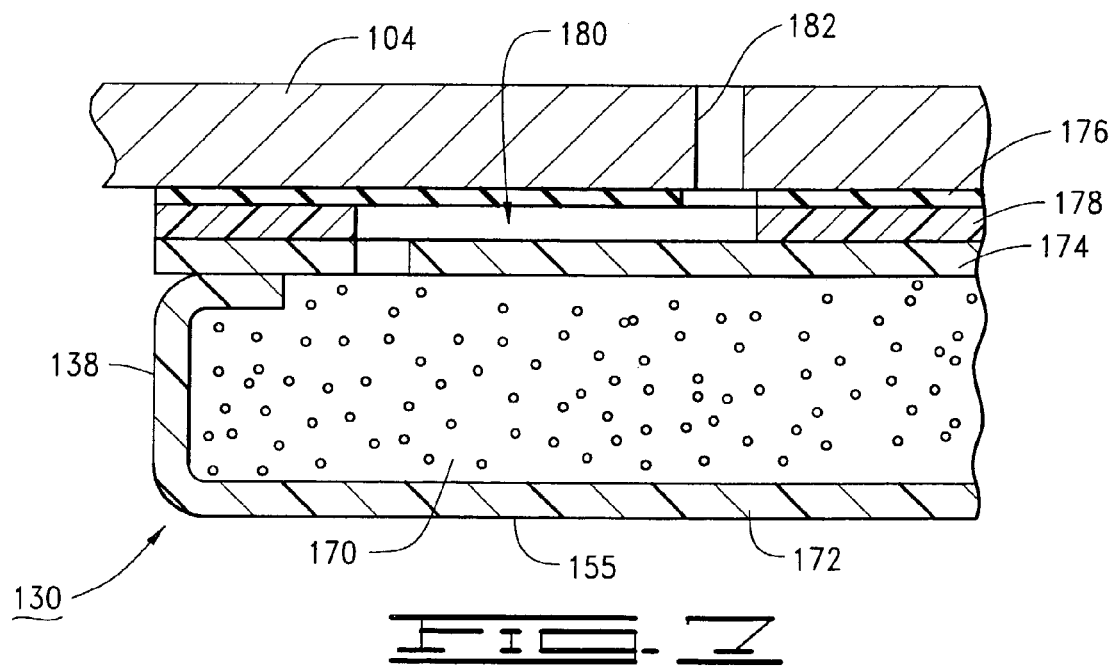
FIG. 7 provides an elevational, cross-sectional view of the chemical adsorbent filter in accordance with a first preferred construction.

FIG. 7 shows the filter 130 in accordance with an alternative preferred construction. The protective layers 172, 174 are bonded together in FIG. 7 in a different manner to provide the first guide surface 138 with a slightly different leading edge profile.

The configuration of FIG. 7 uses the filter 130 as a breather filter to reduce the ingress of harmful contaminants from the external environment into the interior of the housing 101. A third layer 178 is provided with an elongated channel 180 having a desired shape (labyrinth, serpentine, spiral, etc.). This allows the formation of a diffusion path from the external environment, through an inlet aperture 182 in the top cover, through the channel 180, through the boundary layer 174, through the media 170 and through the boundary layer 172 to the interior of the housing 101.

Figure 8:
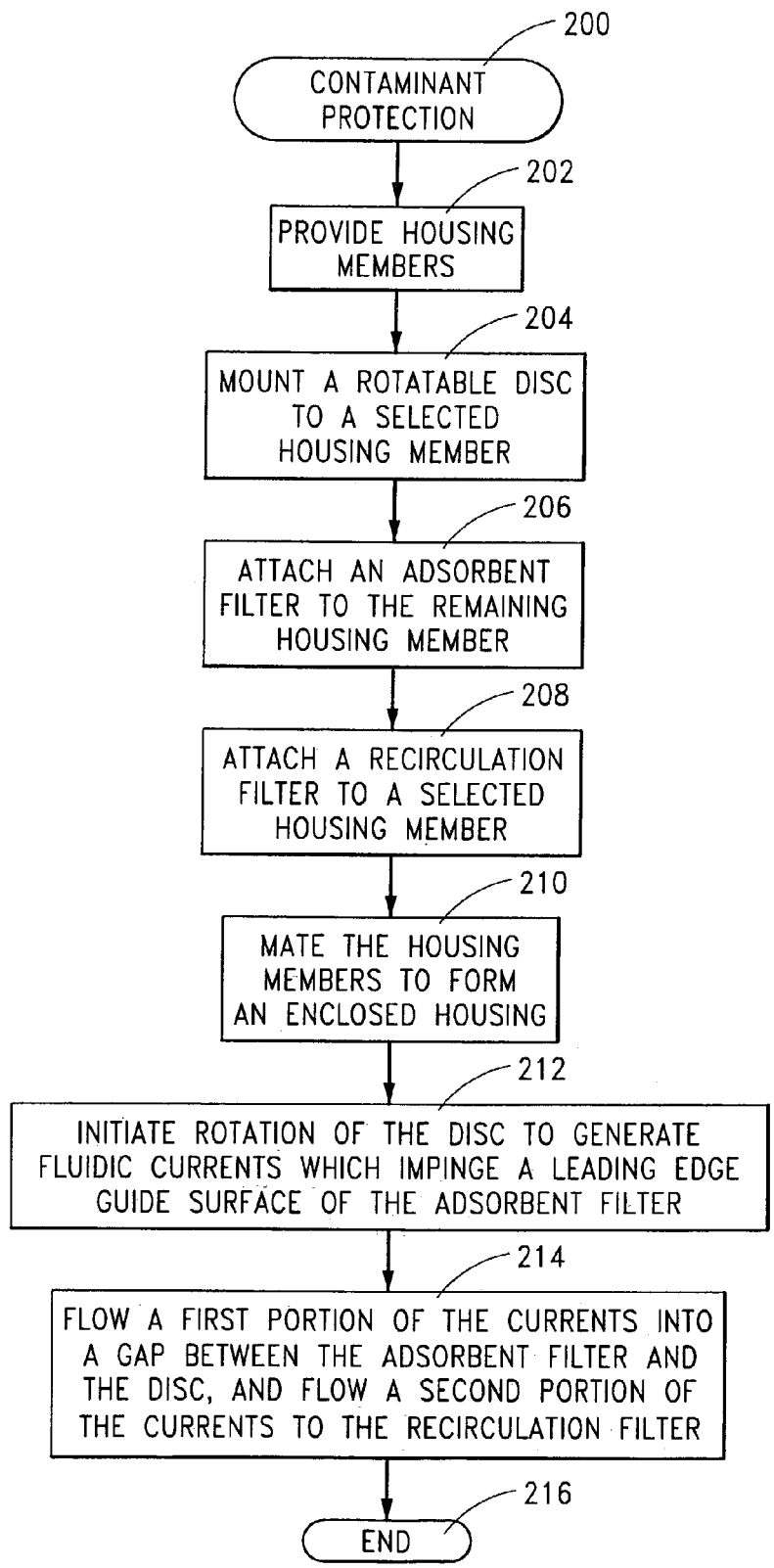
FIG. 8 provides a flow chart for a CONTAMINANT PROTECTION routine, illustrative of steps carried out in accordance with preferred embodiments of the present invention to protect the data storage device from fluid-borne vapor phase and particulate contaminants.

FIG. 8 provides a flow chart for a CONTAMINANT PROTECTION routine 200, generally illustrative of steps carried out in accordance with preferred embodiments to protect a data storage device (such as the disc drive 100) from the adverse effects of particulate and vapor phase contaminants.

First and second housing members (such as the base deck 102 and the top cover 104) are provided at step 202. A rotatable disc (such as 108) is mounted to a selected housing member (such as the base deck 102) at step 204. An adsorbent filter (such as 130) is preferably attached to the remaining housing member (such as the top cover 104) at step 206. A recirculation filter (such as 132) is next installed in a selected housing member at a position beyond the outermost perimeter of the disc 108 at step 208.

At step 210, the first and second housing members are mated to form an enclosed housing (such as 101). Attachment of housing members in this manner results in placement of the adsorbent filter 130 adjacent to and in a facing relationship with a data recording surface of the disc. Thereafter, rotation of the disc 108 at step 212 generates fluidic currents within the housing 101 which impinge a leading edge guide surface of the adsorbent filter 130.

As shown by step 214, the fluidic currents are divided into two portions. The first portion passes into a gap between the filter 130 and the disc 108, and the second portion passes along the guide surface 138 to the recirculation filter 132. Particulate contaminants are filtered from the second portion of the air currents passing through the recirculation filter 132, and particulate and vapor phase contaminants are filtered from the first portion of the air currents passing adjacent the adsorbent filter 130. The routine is shown to end at step 216, but it will be understood that steps 212 and 214 are thereafter repeated each time the drive is activated.

The filter assembly 133 provides several advantages over the prior art. Effective vapor phase and particulate contaminant filtering takes place through the efficient directing of fluidic currents to the recirculation filter 132 by way of the leading edge of the adsorbent filter 130.

The placement and configuration of the adsorbent filter 130 adjacent a disc recording surface facilitates a significant increase in the amount of adsorbent media that can be incorporated into the housing 101, which is especially beneficial in smaller form factor designs. Also, the filter 130 operates to reduce the volume of and turbulence in the fluidic currents that reach the head 112.

The filter 130 provides improved capturing of particulate contaminants along the leading edge guide surface 138, reducing the possibility of subsequent dropping of such contaminants onto the disc recording surface. The filter 130 further operates as an effective channel (by way of the second guide surface 148) to direct fluid currents to the VCM 116 to convectively cool the actuator coil 114.

The filter 130 also potentially reduces costs by further operating as a high capacity, low resistance breather filter for a diffusion path extending through the housing 101, eliminating the need for a separate breather filter.

It will now be understood that the present invention (as embodied herein and as claimed below) is generally directed to a method and apparatus for protecting a data storage device from contaminants.

In accordance with preferred embodiments, the data storage device (such as disc drive 100) comprises a housing (such as 101) which supports a rotatable disc (such as 108) having a data recording surface and an outermost perimeter.

The method preferably includes positioning, within the housing, a filter assembly (such as 133) comprising a first filter (such as 130) adjacent to and in a facing relationship with the data recording surface and a second filter (such as 132) beyond the outermost perimeter, the first filter having a leading edge guide surface (such as 138) which extends substantially across a radial extent of the disc to the outermost perimeter (such as by steps 206, 208 and 210).

The disc is subsequently rotated to generate fluidic currents (such as 136) within the housing, the fluidic currents impinging the leading edge guide surface so that a first portion of the fluidic currents (such as 140) passes into a gap (such as 163) between the first filter and the data recording surface and a second portion of the fluidic currents (such as 142) passes along the leading edge guide surface to the second filter. The first filter preferably comprises a chemically adsorbent filter comprising an adsorbent media (such as 170) which adsorbs vapor phase contaminants. The second filter preferably comprises a pass-through recirculation filter which captures particulate contaminants The apparatus preferably includes a filter assembly (such as 133) supported within the housing and comprising a first filter (such as 131) adjacent the data recording surface, the first filter having an adsorbent surface (such as 155) which extends in a facing relationship with the data recording surface and a leading edge guide surface (such as 138) which extends substantially across a radial extent of the disc to the outermost perimeter.

The filter assembly further preferably comprises a second filter (such as 132) disposed adjacent the outermost perimeter disc of the disc, wherein rotation of the disc generates fluidic currents within the housing that impinge the leading edge guide surface, and wherein a first portion of the fluidic currents passes into a gap between the adsorbent surface and the data recording surface and a second portion of the fluidic currents passes along the leading edge guide surface to the second filter.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed. For example, the particular elements may vary depending on the particular application of the filter assembly without departing from the spirit and scope of the present invention.

In addition, although the embodiments described herein are directed to the filtering of contaminants for a disc drive data storage device, it will be appreciated by those skilled in the art that the plenum assembly can be used for other types of data storage devices, including optical drives and magneto-optical drives, without departing from the spirit and scope of the claimed invention.

What is claimed is:

1. A method comprising a step of rotating a disc surface to establish fluidic currents within a housing so that a first portion of the fluidic currents passes between the surface and a first filter structure and a second portion of the fluidic currents is deflected at a leading edge of the first filter structure, through a second filter structure disposed beyond an outermost perimeter of the surface and aligned with the first filter structure on a radius of said surface, and back to the first filter structure prior to passing a data transducing head adjacent the surface.

2. The method of claim 1, wherein the first filter structure comprises a chemical adsorbent filter which adsorbs vapor phase contaminants from the first portion of the fluidic currents.

3. The method of claim 1, wherein the second filter comprises a pass-through recirculation filter which captures fluid-borne particulates from the second portion of the fluidic currents.

4. The method of claim 1, wherein the first filter comprises an adsorbent surface which extends in a facing relationship to the data recording surface, and wherein the first portion of the fluidic currents flows across the adsorbent surface.

5. The method of claim 4, further comprising a step of flowing the first portion of the fluidic currents out of the gap between the first filter and the data recording surface and to the head to aerodynamically support the head.

6. The method of claim 1, wherein the first filter further comprises a guide surface depending from the leading edge, and wherein the method further comprises flowing the second portion of the fluidic currents adjacent the second filter and back to the first filter so that the second portion of the fluidic currents is directed along the guide surface prior to passing the head.

7. The method of claim 6, wherein an actuator motor positions the head adjacent the data recording surface, and wherein the flowing step further comprises flowing the second portion of the fluidic currents adjacent the actuator motor to convectively cool the actuator motor.

8. The method of claim 1, further comprising a step of adhering the first filter to a surface of a first housing member and mating the first housing member with a second housing member to place the first filter in the facing relationship adjacent the data recording surface.

9. The method of claim 1, further comprising flowing fluid from an external environment through an aperture in the housing into the first filter to equalize internal and external atmospheric pressures and to prevent ingress of fluid-borne contaminants from the external environment into the housing.

10. An apparatus comprising a first filter structure disposed in facing relation to a rotatable surface and comprising a leading edge which extends radially adjacent said surface, and a second filter structure aligned with the first filter structure on a radius of said surface and disposed beyond an outermost perimeter of said surface, wherein rotation of the surface establishes fluidic currents of which a first portion passes between the surface and the first filter structure and of which a second portion is deflected at the leading edge to the second filter structure.

11. The apparatus of claim 10, wherein the leading edge is characterized as a first leading edge, wherein the first filter structure further comprises a second leading edge depending from the first leading edge, and wherein the second portion of said fluidic currents passes through the second filter structure and back adjacent the surface to impinge upon the second leading edge prior to passage adjacent a data transducer adjacent the surface.

12. The apparatus of claim 11, wherein the second portion of said fluidic currents is divided into a third portion which passes between the first filter structure and the surface and a fourth portion which passes along the second leading edge to an actuator motor used to move the data transducer, said fourth portion passing the actuator motor prior to passing said data transducer.

13. A data storage device comprising:
a transfer member adapted for storing input and retrieving output in relation to a moving data storage medium; and
means for filtering fluidic currents generated by the moving data storage medium.

14. The data storage device of claim 13 wherein the means for filtering is characterized by aligned first and second filters on a radius of said data storage medium, the fist filter in facewise disposition adjacent the data storage medium and having a leading edge that deflects the fluidic currents toward the second filter that is spatially disposed beyond an outer edge of the data storage medium.

15. The data storage device of claim 13 wherein the means for filtering is characterized by the cooperative use of adsorbent filtering material and pass-through recirculation filtering material.

16. The data storage device of claim 13 wherein the means for filtering is characterized by a fluidic current stripper member comprising adsorbent material.

17. The data storage device of claim 13 wherein the means for filtering is characterized by passing the fluidic currents past an absorbent material, then through a pass-through recirculation filtering material, and then past the absorbent material again prior to flowing across the transfer member.

18. The data storage device of claim 13 wherein the means for filtering is characterized by simultaneously filtering both vapor phase contaminants and fluid-borne particulates in the fluidic current.

19. The data storage device of claim 13 wherein the means for filtering is characterized by disposing an adsorbent material in a diffusion path communicating a pressure differential between an external environment and an interior chamber containing the transfer member and data storage member.

* * * * *